Patented Feb. 21, 1928.

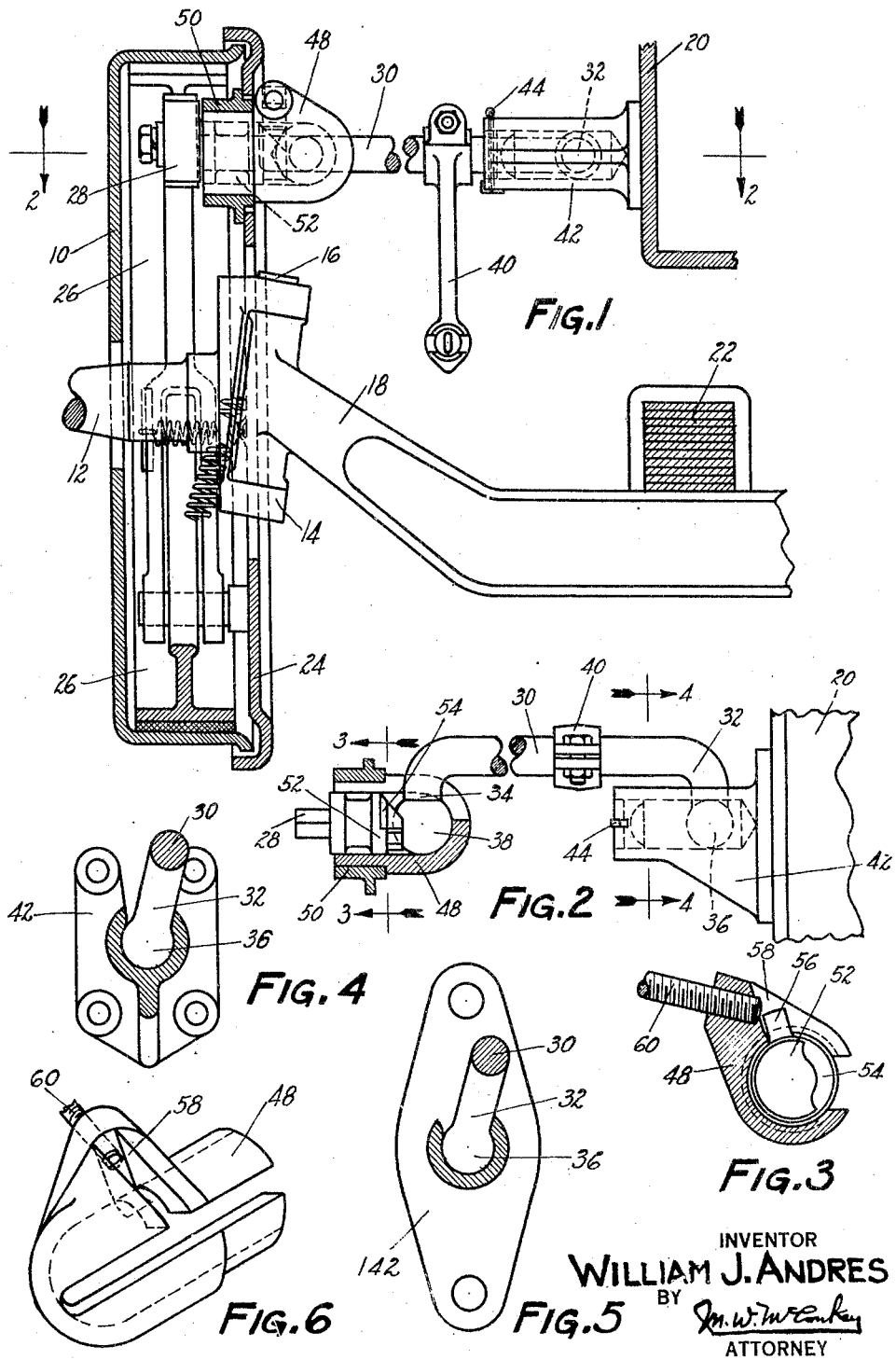

1,660,148

UNITED STATES PATENT OFFICE.

WILLIAM J. ANDRES, OF SOUTH BEND, INDIANA, ASSIGNOR TO BENDIX BRAKE COMPANY, OF CHICAGO, ILLINOIS, A CORPORATION OF ILLINOIS.

BRAKE-OPERATING MECHANISM.

Application filed May 6, 1926. Serial No. 107,162.

This invention relates to brakes, and is illustrated as embodied in control mechanism for a brake on a swivelled front wheel. An object of the invention is to simplify the operating mechanism by reducing the number of parts, and particularly the expensive small parts of universal joints and the like, which require a great deal of careful machining.

Having this object in view, I propose to operate the brakes by means of a novel shaft having one end, or preferably both ends, cranked or offset, to form a bowed shaft intended to oscillate about an axis outside of the shaft; i. e. about an axis passing through its ends.

By this arrangement, the outer end of the shaft may be universally supported adjacent the brake, for example by forming a ball at its end, or otherwise forming a universal joint which, when the brake is on a swivelled wheel, will be substantially in the swivelling axis of the wheel. The illustrated support is a hollow shaft, embodying in itself and in its operation of the brake several important minor features of novelty, and having a slot in its side for the crank arm terminating in the ball received in the hollow of the shaft.

I prefer to support the inner end of the shaft on the chassis frame, for example by a novel support having a cylindrical bore slidably and oscillatably supporting a ball on the end of the shaft.

The above and other objects and features of the invention, including various novel combinations of parts and desirable particular constructions, will be apparent from the following description of one illustrative embodiment shown in the accompanying drawings, in which:

Figure 1 is a vertical transverse section through one front brake, and through associate parts;

Figure 2 is a partial horizontal section, looking downward generally on the line 2—2 of Figure 1;

Figure 3 is a detail section on the line 3—3 of Figure 2;

Figure 4 is a section on the line 4—4 of Figure 2, showing the support on the chassis frame;

Figure 5 is a view corresponding to Figure 4, but showing a different support; and Figure 6 is a perspective of the hollow shaft.

In the illustrated arrangement, the brake includes a drum 10 secured to a wheel (not shown) rotatably mounted on the spindle 12 of a knuckle 14 swivelled, as by a king pin 16, at one end of the front axle 18. Axle 18, with a rear axle (not shown), supports the chassis frame 20 by means of the usual springs 22. The open side of the drum 10 is closed by a backing plate 24 carried by the knuckle 14.

The brake is shown with shoes 26 forced against the drum to apply the brake by a double cam 28, or by some equivalent device. The brake illustrated is substantially like the one fully described in Patent No. 1,567,716, granted Bendix Brake Company, December 29, 1925, on an application filed by Adiel Y. Dodge.

Except as further described below, the above-identified parts or their equivalents may be of any desired construction.

According to an important feature of the invention, the brake is applied by a novel shaft 30 having inner and outer cranked ends 32 and 34, preferably integral with the shaft, and which are shown terminating in ball members 36 and 38 larger than the shaft. The complete shaft can conveniently be made as a forging, with a minimum number of finishing operations. An arm 40, or other suitable means, is provided for rocking the shaft to apply the brake.

The inner end of the shaft is universally supported on the chassis frame 20, in a manner permitting lengthwise movement of the shaft, by means such as a support or bracket 42, bolted or otherwise secured to the frame. This support is shown with a cylindrical bore slidably receiving ball 36, and blocked at its outer end by a cotter pin 44 or the like to prevent escape of ball 36. There is a slot in the front side of support 42, slightly smaller than ball 36 so as to confine the ball in the bore, but considerably larger than the cranked end 32 of the shaft, so that the support does not interfere with considerable oscillation of the shaft.

Ball 38 at the other end of the shaft is arranged to be inserted through the open (left in Figure 1, right in Figure 6) end of a novel hollow shaft 48 journalled in a bearing 50 secured to the backing plate 24. Hollow shaft 48 is formed on its upper side with a slot just wide enough to permit passage of the cranked end 34, so that the sides of the slot embrace this end 34 in such a manner that shaft 30 rocks shaft 48, although there is no interference with oscillation of shaft 30 about an axis passing through the center of ball 38 perpendicular to the paper in Figure 2.

The right end (Figure 1) of hollow shaft 48 is closed by a semi-spherical socket engaging one side of ball 38. The slot in the top of hollow shaft 48 is smaller than ball 38 and confines it in the shaft. Cam 28 is shown formed with a half-socket portion 52, preferably integral with the cam, projecting into the open end of shaft 48, and, with the half-socket on the end of the shaft, forming a ball-and-socket universal joint with ball 38. The half socket 52 is cut away opposite the slot in hollow shaft 48, as appears in Figures 2 and 3, at 54, to permit oscillation of shaft 30 in a horizontal plane through a considerable arc.

Socket 52 is also formed with a side lug 56, insertible through the above-mentioned slot in the top of the hollow shaft, and then turned 90° into a cross slot 58 (Figure 6), forming in effect a bayonet joint locking the cam and hollow shaft together, and locking ball 38 in place. Lug 56 is adjustably engaged by a setscrew 60 carried by shaft 48, so that the rocking of the hollow shaft 48 by the cranked end 34 serves to rock cam 28 to apply the brake. It should be noted that, when the parts are all assembled, the center of ball 38 is substantially in the swivelling axis of the wheel (i. e. in the axis of king pin 16).

In Figure 5 is shown a support or bracket 142, which is the same as support 42 except that it is held by two bolts instead of four.

It should be noted that cranked end 34 is substantially horizontal when the brake is not applied, and is therefore at an angle of some 15° to the horizontal when the brake is applied, such that swivelling the wheel causes the slot in hollow shaft 48 to wedge on cranked end 34, slightly to relieve the pressure on the brake when the wheel is on the outer side of the turn, and slightly to tighten the brake when the wheel is on the inner side of the turn.

While one illustrative embodiment of the invention has been described in detail, it is not my intention to limit the scope of the invention to that particular embodiment, or otherwise than by the terms of the appended claims.

I claim:

1. Operating means for a brake on a vehicle wheel comprising, in combination, a shaft having cranked ends and movably supported at said ends, means for rocking the shaft about an axis spaced from the axis of the shaft, and brake-applying means operated by engagement with one of said cranked ends.

2. Operating means for a brake on a vehicle wheel comprising, in combination, a shaft having cranked ends and movably supported at said ends, means for rocking the shaft about an axis passing through the movably-supported ends of the shaft, and brake-applying means operated by engagement with one of said cranked ends.

3. Operating means for a brake on a vehicle wheel comprising, in combination, a shaft having cranked ends offset on the same side of the shaft and universally supported at said ends, means for rocking the shaft about an axis spaced from the axis of the shaft, and brake-applying means operated by engagement with one of said cranked ends.

4. Operating means, for a brake on a vehicle wheel forming part of a chassis including a yieldingly-supported frame, comprising, in combination, a bowed shaft having cranked ends, means for universally supporting one of said cranked ends at the brake and the other of said ends on the frame opposite the brake, means for rocking the shaft about its ends, and brake-applying means operated by engagement with the first of the cranked ends.

5. Operating means, for a brake on a vehicle wheel forming part of a chassis including a yieldingly-supported frame, comprising, in combination, a bowed shaft having cranked ends, means for universally supporting one of said cranked ends at the brake and the other of said ends on the frame opposite the brake, one of said ends having movement lengthwise of the shaft to compensate for movement of the frame, means for rocking the shaft about its ends, and brake-applying means operated by engagement with the first of the cranked ends.

6. Operating means for a brake on a vehicle wheel forming part of a chassis including a yieldingly-supported frame, comprising, in combination, a bowed shaft having cranked ends on the same side, means for universally supporting the outer end of the shaft adjacent the brake, means for universally supporting the inner end of the shaft on the chassis frame in a manner permitting the shaft to move axially, and brake-applying means operated by engagement with the outer end.

7. Operating means for a brake on a vehicle wheel forming part of a chassis including a yieldingly-supported frame, comprising, in combination, a bowed shaft having cranked ends on the same side, means for universally supporting the outer end of the shaft adjacent the brake, means for universally supporting the inner end of the shaft on the chassis frame in a manner permitting the shaft to move axially, and brake-applying means having parts on opposite sides of the outer cranked end of the shaft and operated by engagement of said parts with said end.

8. Operating means, for a brake on a vehicle wheel forming part of a chassis including a yieldingly-supported frame, comprising, in combination, a bowed shaft having cranked ends terminating in ball members, a cylindrical socket member on said frame slidably and oscillatably receiving the inner ball member, a socket member adjacent the brake receiving the outer ball member, means for rocking the shaft about an axis passing through said ball members, and brake-applying means operated by rocking the shaft.

9. Operating means, for a brake on a swivelled vehicle wheel forming part of a chassis including a yieldingly-supported frame, comprising, in combination, a bowed shaft having cranked ends terminating in ball members, a cylindrical socket member on said frame slidably and oscillatably receiving the inner ball member, a socket member substantially at the swivelling axis and adjacent the brake receiving the outer ball member, means for rocking the shaft about an axis passing through said ball members, and brake-applying means operated by rocking the shaft.

10. Operating mechanism, for a brake on a swivelled vehicle wheel forming part of a chassis including a yieldingly-supported frame, comprising, in combination, a bowed shaft having cranked ends, means universally supporting the inner end on the chassis frame in a manner permitting the shaft to move axially, means universally supporting the outer end substantially at the swivelling axis of the wheel, and brake-applying means operated by the shaft.

11. Operating mechanism, for a brake on a swivelled vehicle wheel forming part of a chassis including a yieldingly-supported frame, comprising, in combination, a bowed shaft having cranked ends, means supporting the inner end on the chassis frame, means supporting the outer end substantially at the swivelling axis of the wheel, and brake-applying means operated by the shaft.

12. Operating mechanism, for a brake on a swivelled vehicle wheel, comprising, in combination, a shaft having cranked ends, means movably supporting the shaft by said ends, the outer end being universally supported substantially in the swivelling axis of the wheel, and brake-applying means operated by the shaft.

13. Operating mechanism, for a brake on a swivelled vehicle wheel, comprising, in combination, a shaft having cranked ends, means movably supporting the shaft by said ends, the outer end being universally supported substantially in the swivelling axis of the wheel, means for rocking the shaft about an axis passing through said ends, and brake-applying means operated by engagement with the outer bowed end.

14. Brake-operating mechanism comprising, in combination, a rotatably-supported hollow shaft having a socket in its end and a slot in its side communicating with the socket, a brake-applying device operated by rotation of the hollow shaft, and an operating member having a ball end universally received in said socket and an arm passing through the slot and rocking the shaft by engagement with the sides of the slot.

15. Brake-operating mechanism comprising, in combination, a rotatably-supported hollow shaft having a socket in its end and a slot in its side communicating with and smaller than the diameter of the socket, a brake-applying device operated by rotation of the hollow shaft, and an operating member having a ball end universally received in said socket and an arm smaller than the ball end and passing through the slot and rocking the shaft by engagement with the sides of the slot.

16. Brake-operating mechanism comprising, in combination, a rotatably-supported hollow shaft having a socket in its end and a slot in its side communicating with and smaller than the diameter of the socket, a brake-applying device operated by rotation of the hollow shaft, and an operating member having a ball end universally received in said socket and an arm smaller than the ball end and passing through the slot and rocking the shaft by engagement with the sides of the slot, the shaft and said member being assembled by passing the ball end into the end of the hollow shaft opposite the socket, the slot extending to said end opposite the socket to permit such assembly.

17. Brake-operating mechanism comprising, in combination, a hollow shaft open at one end and closed by a semi-spherical socket at the other end and formed with a slot in its side extending from the open end into the socket, brake-applying means operated by the shaft, and an operating member having a ball end inserted through the open end of the shaft and received in the socket and having an arm passing through the slot.

18. Brake-operating mechanism comprising, in combination, a hollow shaft open at one end and closed by a semi-spherical socket at the other end, and formed with a slot in its side extending from the open end into the socket, an operating member having a ball end inserted through the open end of the shaft and received in the socket and having an arm passing through the slot, and brake-applying means blocking the open end of the shaft and holding the ball end in the socket and operated by the shaft.

19. Brake-operating mechanism comprising, in combination, a hollow shaft open at one end and formed with a semi-spherical socket portion in the other end and having a slot in its side, a cam having a semi-spherical socket portion extending into the open end of the shaft, and an operating member extending through the slot and having a ball end received between the two socket portions.

20. Brake-operating mechanism comprising, in combination, a hollow shaft open at one end and formed with a semi-spherical socket portion in the other end and having a slot in its side, a cam having a semi-spherical socket portion extending into the open end of the shaft, an operating member extending through the slot and having a ball end received between the two socket portions, and adjustably-interengaging parts carried by the shaft and cam in such a manner that the shaft rocks the cam.

21. Brake-operating mechanism comprising, in combination, a hollow shaft open at one end and formed with a semi-spherical socket portion in the other end and having a slot in its side, a cam having a semi-spherical socket portion extending into the open end of the shaft, an operating member extending through the slot and having a ball end received between the two socket portions, and adjustably-interengaging parts carried by the shaft and cam in such a manner that the shaft rocks the cam and so formed as to hold the cam in place axially of the shaft.

22. Operating mechanism, for a brake on a wheel forming part of a chassis including a yieldingly-supported frame, comprising, in combination, a support on the frame having a cylindrical bore and a slot in its side, and a brake-operating shaft having a cranked end passing through the slot and terminating in a ball slidably received in said bore.

23. Operating mechanism, for a brake on a wheel forming part of a chassis including a yieldingly-supported frame, comprising, in combination, a support on the frame having a cylindrical bore and a slot in its side smaller than the diameter of the bore, and a brake-operating shaft having a cranked end passing through the slot and terminating in an enlarged ball slidably received in said bore.

24. Operating mechanism, for a brake on a wheel forming part of a chassis including a yieldingly-supported frame, comprising, in combination, a support on the frame having a cylindrical bore and a slot in its side smaller than the diameter of the bore, a brake-operating shaft having a cranked end passing through the slot and terminating in an enlarged ball slidably received in said bore, and means for blocking the end of the bore to prevent escape of said ball.

25. Operating mechanism for a brake on a swivelled wheel comprising, in combination, a brake-applying shaft having a cranked end, and a device operated by engagement with said cranked end to apply the brake and arranged to wedge against said end when the wheel is swivelled to vary the pressure on the brake.

26. Operating mechanism for a brake on a swivelled wheel comprising, in combination, a brake-applying shaft having a cranked end, and a device operated by engagement with said cranked end to apply the brake and arranged to wedge against said end to relieve the pressure on the brake when the wheel is swivelled to place it on the outer side of the turn.

27. Operating mechanism for a brake on a swivelled wheel comprising, in combination, a brake-applying shaft having a cranked end terminating in a ball substantially at the swivelling axis of the wheel, and a hollow shaft enclosing said ball and having a slotted side embracing the cranked end and operated by said end to apply the brake and arranged to wedge against said end when the wheel is swivelled with the brake applied to vary the pressure on the brake.

In testimony whereof, I have hereunto signed my name.

WILLIAM J. ANDRES.